United States Patent [19]
Mitchell et al.

[11] Patent Number: 5,918,636
[45] Date of Patent: Jul. 6, 1999

[54] FUEL ECONOMISER

[76] Inventors: Herbert Mitchell, 281 Upper Kilmacud Road, Dublin, Ireland; Thomas Gunn, 169 Fortfield Road, Terenure, Dublin, Ireland, 6 .W.

[21] Appl. No.: 08/835,415

[22] Filed: Apr. 9, 1997

[30]  Foreign Application Priority Data

Apr. 10, 1996 [IE] Ireland .................................. S96 0278

[51] Int. Cl.$^6$ .............................. F15D 55/00; C02F 1/48
[52] U.S. Cl. .................... 138/39; 138/177; 138/DIG. 11; 210/222
[58] Field of Search ................................ 138/39, 37, 103, 138/177, 178, DIG. 11; 210/222; 137/827; 123/538

[56]   References Cited

U.S. PATENT DOCUMENTS

| | | | |
|---|---|---|---|
| 3,349,354 | 10/1967 | Miyata | 210/222 |
| 4,216,092 | 8/1980 | Shalhoob et al. | 210/222 |
| 4,265,754 | 5/1981 | Menold | 210/222 |
| 4,572,145 | 2/1986 | Mitchell et al. | 210/222 X |
| 4,755,288 | 7/1988 | Mitchell et al. | 210/222 X |
| 5,348,050 | 9/1994 | Ashton | |
| 5,411,143 | 5/1995 | Greene | |

FOREIGN PATENT DOCUMENTS

| | | |
|---|---|---|
| 0182052 | 5/1986 | European Pat. Off. . |
| WO95/04000 | 2/1995 | WIPO . |
| WO95/14855 | 6/1995 | WIPO . |

*Primary Examiner*—Patrick Brinson
*Attorney, Agent, or Firm*—Jacobson, Price, Holman & Stern, PLLC

[57]   ABSTRACT

A fuel economizer device including a conduit through which fuel flows, a Faraday housing around part of the conduit and end caps at each end of the housing for mounting the housing to the conduit. Magnets of Neodymium material are mounted in the housing along the conduit. The conduit is flattened at respective magnet receiving locations and the magnets themselves are of a flattened construction to engage as much as possible of the flattened face of the magnets with the conduit, thereby concentrating the magnetic field.

22 Claims, 3 Drawing Sheets

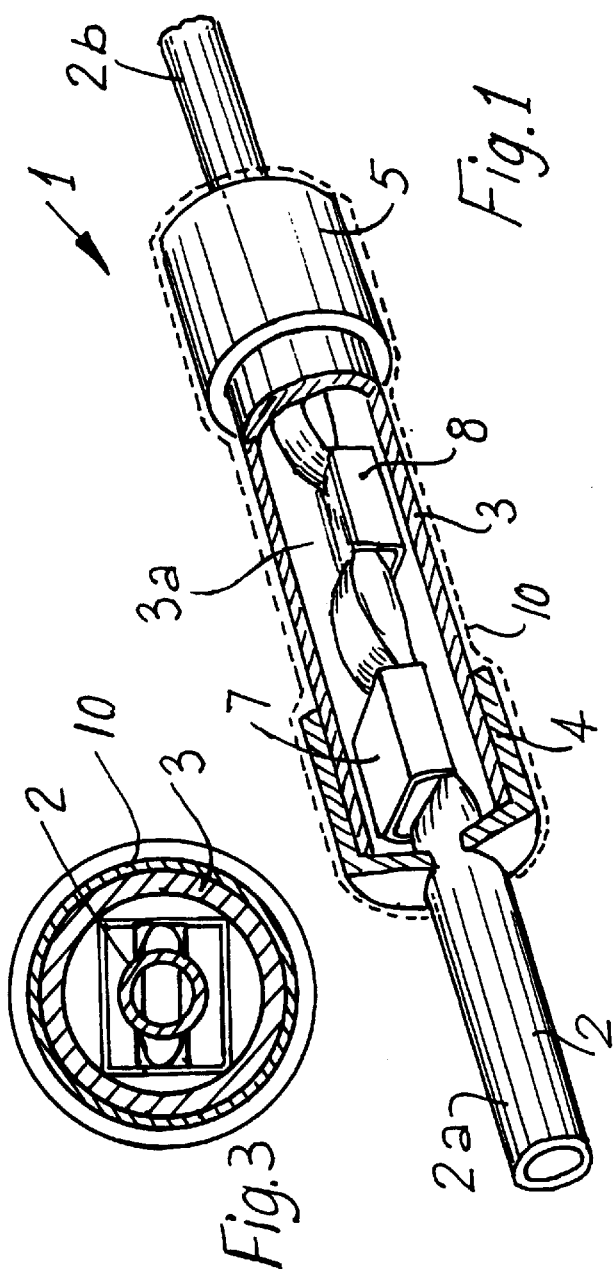
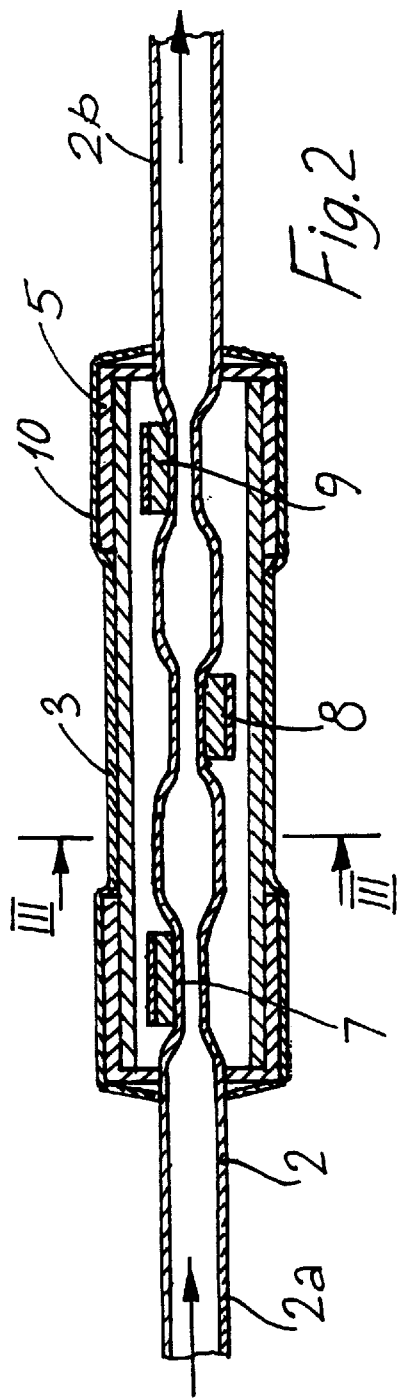

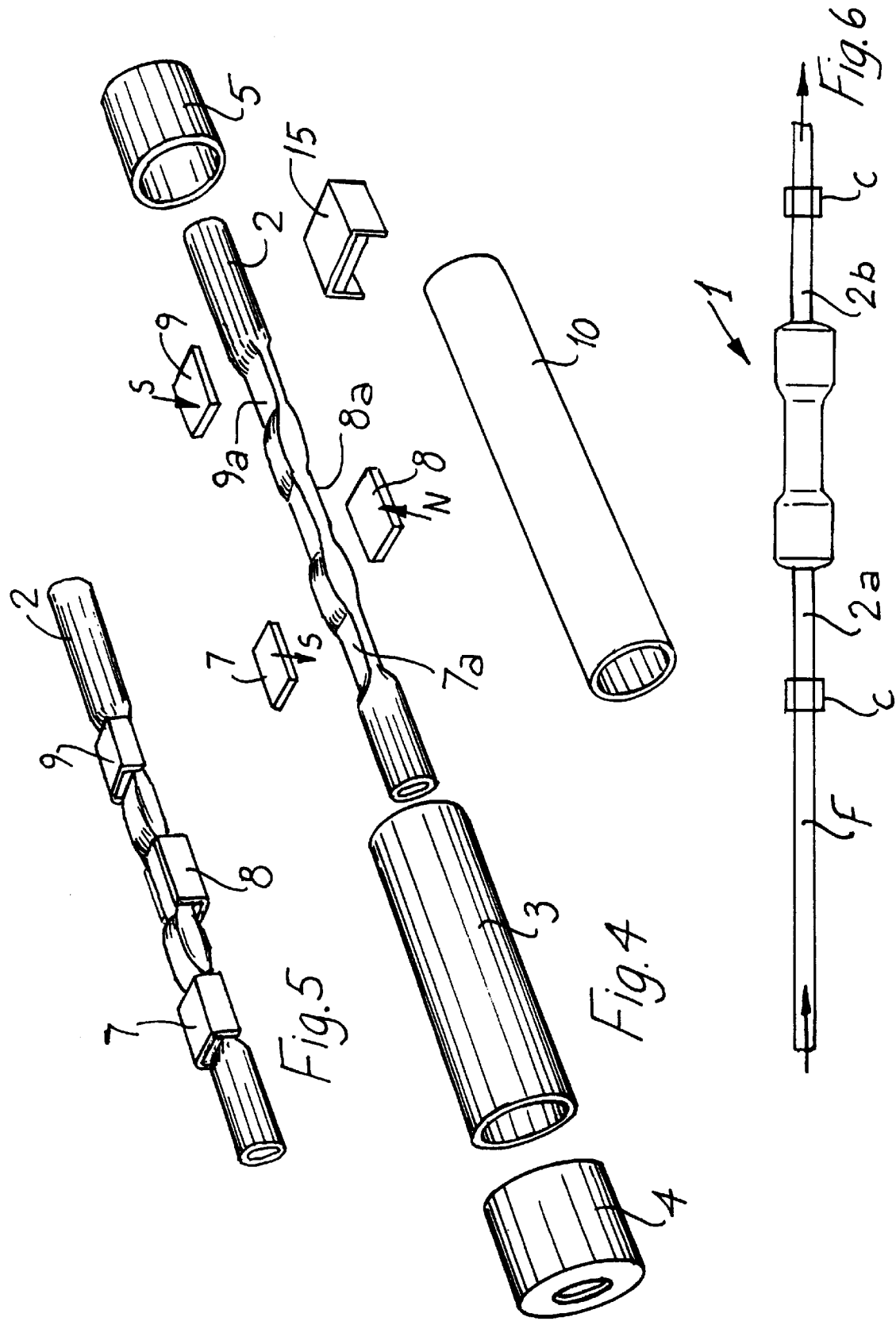

FUEL ECONOMISER

The invention relates to a fuel economiser device.

INTRODUCTION

Various attempts have been made to pass fuel through a magnetic force field in order to improve the combustion efficiency of the fuel and minimise exhaust emissions. However, known devices are either difficult to install or have not proved to be sufficiently effective in use.

There is therefore a need for an improved fuel economiser device which will overcome at least some of these problems. This invention is directed towards providing such a device.

STATEMENTS OF INVENTION

According to the invention, there is provided a fuel economizer device comprising:

- a conduit section through which fuel is passed;
- a non magnetic housing around the conduit section; and
- a number of magnets positioned and orientated in the housing to generate a strong magnetic field through which fuel flowing in the conduit passes.

The flattening or crimping of the conduit ensures that the magnets are brought into close proximity with the fuel. Substantially all fuel flowing through the conduit is exposed to a uniform magnetic field.

Preferably, at least some of the magnets are of generally rectilinear flattened shape.

In an especially important aspect, the conduit has a flattened section in the region of a magnet to concentrate the magnetic field and to facilitate positioning of generally flat magnets against the conduit.

In a preferred embodiment of the invention, at least some of the magnets are longitudinally spaced-apart along the conduit in the housing. Preferably, the magnets are orientated so that the poles of longitudinally adjacent magnets are oppositely directed.

In one embodiment of the invention, a first pair of magnets are located on one side of the conduit and another magnet is located on an opposite side of the conduit intermediate the first pair of magnets.

The housing is of a material such that it creates a Faraday housing around the magnetic field. The housing is of a ferrous metal material insulated from the magnets. It has the dual purpose of concentrating the magnetic field within the housing and of preventing any stray magnetic field from adversely influencing electronic devices or control units in the immediate vicinity of the unit.

In one embodiment of the invention, the Faraday housing is filled with resin to embed the magnets in the housing.

The Faraday housing preferably includes end caps for mounting the housing to the conduit.

The Faraday housing may be covered by a covering such as a sheath of elastomeric material.

In a particularly preferred embodiment of the invention, the magnets are of Neodymium.

DETAILED DESCRIPTION OF THE INVENTION

The invention will be more clearly understood from the following description thereof given by way of example only with reference to the accompanying drawings in which:

FIG. 1 is a perspective, partially cut-away view of a fuel economiser device according to the invention;

FIG. 2 is a longitudinal cross sectional view of the device;

FIG. 3 is a cross sectional view on the line III—III in FIG. 2;

FIG. 4 is an exploded perspective view of the device;

FIG. 5 is a perspective view of part of the device;

FIG. 6 is a schematic view of the device in use;

Figure 7:
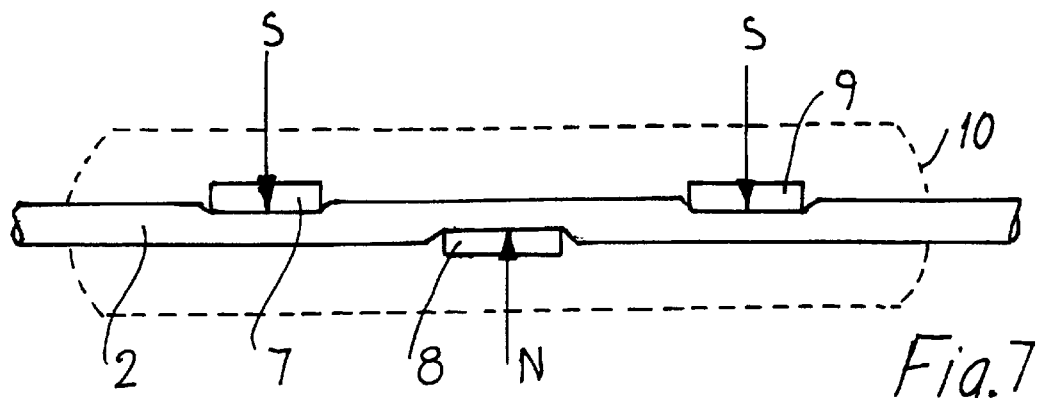
FIG. 7 is a cross sectional view showing the arrangement of the magnets.

Referring to the drawings and initially to FIGS. 1 to 7, there is illustrated a fuel economiser device according to the invention and indicated generally by the reference numeral 1. The device 1 comprises a cylindrical conduit of non magnetic material such as copper through which fuel flows, a Faraday housing 3 around part of the conduit 2 and end caps 4, 5 at each end of the housing for mounting the housing 3 to the conduit 2. The conduit 2 has end sections 2A, 2B for attachment to the fuel line of a vehicle upstream of the carburetor.

Magnets are mounted in the Faraday housing 3. In this case, there are three separate bar magnets 7, 8, 9 which are longitudinally equi-spaced-apart along the conduit 2. Each of the magnets is of Neodymium material and is of generally rectilinear shape. The conduit 2 is flattened at respective magnet receiving locations 7a, 8a, 9a to engage as much as possible of the flattened face of the magnets 7, 8, 9 with the conduit 2, thereby concentrating the magnetic field. The magnets 7,8,9 are held in place by covers which in this case are self adhesive pads. These assist in centering and securing the magnets in place.

It will be noted that the magnets are positioned and orientated so that the poles of adjacent magnets are oppositely directed. In this case, the face of the magnet 7 engaging the conduit 2 is a south pole. This is followed by a north pole defined by the magnet 8 and then a final south pole defined by the magnet 9.

The Faraday housing 3 is filled with a suitable resin to permanently correctly position the magnets 7, 8, 9 in the housing 3 and relative to the conduit 2 through which the fuel flows. To substantially prevent leakage of a magnetic field, the housing 3, end caps 4, 5 and part of the conduit 2 are further encased by a sheath 10 of elastomeric material.

The fuel economiser device 1 is installed in the fuel line F of a vehicle upstream of the carburetor. The device 1 can be quickly and easily installed by cutting the fuel line F at an appropriate location and attaching the device in line. Sections of flexible hosing and jubilee clips or the like may be used to reconnect the fuel line F and C.

We have found that the device is particularly advantageous in providing a particularly strong concentrated magnetic field through which the fuel passes. The magnetic field has a minimum strength of 11,000 Gauss (1.1 Tesla).

The device of the invention is particularly effective in use in reducing fuel consumption by up to 10–12% while substantially reducing exhaust emissions.

It is believed that as hydrocarbon fuel is passed through the device of the invention, the spin of the hydrogen nuclei and their associated electrons at the atomic level is altered. The cumulative effect is that the molecules are directed and the viscosity/density is decreased as the intermolecular forces are reduced. In the combustion process, the hydrocarbons therefore react more efficiently with oxygen with reduced exhaust emissions. The Faraday housing concentrates a localised magnetic flux density on the flow area only which effectively intensifies the apparent strength of the magnet.

EXAMPLE 1

The unit described above with reference to FIGS. 1 to 7 was fitted in the fuel line of a RABA 10,380 cc tractor with 4567.86 working hours.

The fuel consumption without the device fitted was 13 litres/hour. The average exhaust emissions contained 1,04 ppm particulate carbon.

After 5 minutes running with the device fitted, fuel consumption decreased to 12 litres/hour and average exhaust emissions were 0.77 ppm particulate carbon.

After 20 minutes running with the device fitted, fuel consumption was reduced to 11 litres/hour and average exhaust emissions were 0.81 ppm particulate carbon.

EXAMPLE 2

The unit described above with reference to FIGS. 1 to 7 was fitted to the fuel line of a test engine as follows.

The relevant equipment included a complete BOSCH engine testing facility linked with a 10.35 litres motor/diesel type D2156HM6 (motor number 200174/830). The maximum available mileage was 132.3 kW. In order to assess the performance of the device, initial measurements were taken with it and these were followed by additional measurements after its installation in the fuel line of the engine. Operations were effected over several months and a set of resulting data is appended below to represent results typical of those obtained from a number of other parallel experiments.

TABLE 1

Mileage: 122.5 kW Brake Power 500 N/2450 rpm

| Particulates (Carbon) | Fuel Consumption (Seconds) | (Liters/Hour) | Engine Water Temperatures (C.) | Time (Seconds) |
|---|---|---|---|---|
| 1. Without the device: | | | | |
| 1.38 | 9.9 | 36.36 | 78 | 0 |
| 2. With the device: | | | | |
| 1.30 | 9.9 | 36.36 | 83 | 10 |
| 0.93 | 10.3 | 34.95 | 82 | 20 |
| 0.91 | 9.9 | 36.36 | 83 | 30 |
| 0.91 | 10.1 | 35.64 | 83 | 40 |
| 0.74 | 10.1 | 35.64 | 84 | 50 |
| 0.66 | 10.2 | 35.29 | 83 | 60 |
| 0.63 | 10.2 | 35.29 | 83 | 70 |

TABLE 2

Mileage: 80 kW Brake Power 400 N/2000 rpm

| Particulates (Carbon) | Fuel Consumption (Seconds) | (Liters/Hour) | Engine Water Temperatures (C.) | Time (Seconds) |
|---|---|---|---|---|
| 1. Without the device: | | | | |
| 0.3 | 16.1 | 22.36 | 84 | 0 |
| 2. With the device: | | | | |
| 0.22 | 16.2 | 22.22 | 84 | 20 |
| 0.2 | 16.2 | 22.22 | 84 | 40 |
| 0.13 | 16.5 | 21.82 | 84 | 70 |

EXAMPLE 3

The unit of FIGS. 1 to 7 was fitted to the fuel line of a diesel 1992 280 Scania 93 truck. A reduction of 10–11% in diesel consumption was achieved.

Figure 8:
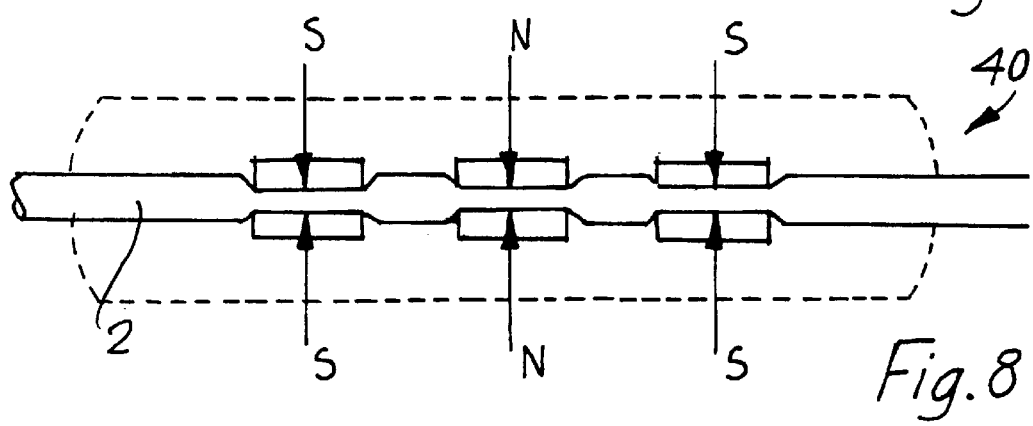
FIGS. 8 to 10 are cross sectional views showing various other arrangements of magnets.

Referring to FIG. 8, there is illustrated another device 40 with a different arrangement of magnets. In this case, there are six magnets, three on opposite sides of the conduit. The magnets in this case are arranged so that similar poles of each pair are facing.

Figure 9:
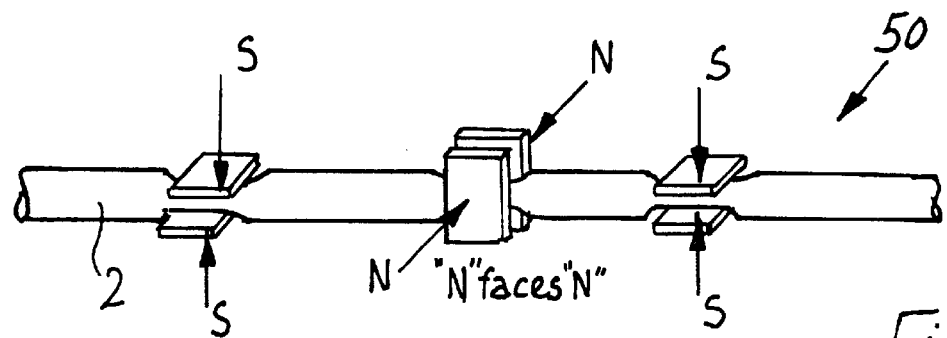

Referring to FIG. 9, there is illustrated another device 50 with a different arrangement of magnets. In this case, two of the magnets are arranged at right angles to the others.

It will be appreciated, particularly in relation to the embodiments of FIGS. 1 to 7, and 9 that the magnets may be arranged with attracting poles facing.

Figure 10:
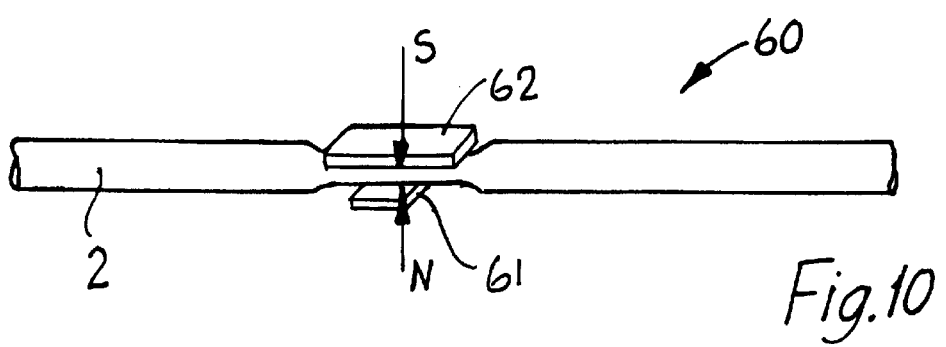

Referring to FIG. 10, there is illustrated another device 60 in which there is a short N pole magnet 61 and a longer S pole magnet 62. The N pole magnet 61 is half the length of the S pole magnet 62 and is arranged axially centrally with respect to the S pole magnet 62. In this way fuel flowing through the conduit 2 first encounters an S pole, then facing S and N poles and finally an S pole.

EXAMPLE 4

Tests were carried out using a RABA DZ156 HM6 10350 ccm tractor. The results achieved are summarised in the following table.

TABLE 3

| | | | Fuel Consumption with device fitted (liters/hour) | | |
|---|---|---|---|---|---|
| Speed (rpm) | Load (N) | Fuel Consumption without device fitted (liters/hour) | FIGS. 1 to 7 | FIG. 8 | FIG. 9 |
| 2220 | 300 | 19.67 | 19.25 | 19.35 | 19.46 |
| 2220 | 400 | 24.49 | 23.84 | 24.16 | 24.32 |
| 2210 | 500 | 30.25 | 29.51 | 29.75 | 29.75 |
| 2230 | 600 | 36.36 | 35.64 | 36.00 | 36.00 |

In addition, at a speed of 2200 rpm and a load applied of 605N, the following loads were achieved using the devices of the invention:

The invention is not limited to the embodiments hereinbefore described which may be varied in construction and detail.

We claim:

1. A fuel economiser device comprising:

a conduit section through which fuel is passed;

a non magnetic housing around the conduit section; and a number of magnets positioned and orientated in the housing to generate a strong magnetic field through which fuel flowing in the conduit passes;

the conduit having a reduced-diameter flattened section in the region of a magnet to concentrate the magnetic field in a reduced cross-sectional area of the flattened section of the conduit and to facilitate positioning of the magnets against the conduit.

2. A fuel economiser device as claimed in claim 1 wherein at least some of the magnets are of generally rectilinear flattened shape to conform with the corresponding flattened section of the conduit.

3. A fuel economiser device as claimed in claim 1 wherein at least some of the magnets are longitudinally spaced-apart along the conduit in the housing.

4. A fuel economiser device as claimed in claim 3 wherein the magnets are longitudinally equi-spaced along the conduit.

5. A fuel economiser device as claimed in claim 3 wherein the magnets are orientated so that the poles of longitudinally adjacent magnets are oppositely directed.

6. A fuel economiser device as claimed in claim 1 wherein a first pair of magnets are located on one side of the conduit and another magnet is located on an opposite side of the conduit intermediate the first pair of magnets.

7. A fuel economiser device as claimed in claim 1 wherein the housing is of a material to create a Faraday housing around the magnetic field generated by the magnets.

8. A fuel economiser device as claimed in claim 7 wherein the housing is of a ferrous metal material insulated from the magnets.

9. A fuel economiser device as claimed in claim 1 wherein the housing includes means for embedding the magnets in the housing.

10. A fuel economiser as claimed in claim 9 wherein the means for embedding the magnets in the housing comprises a resin filling.

11. A fuel economiser device as claimed in claim 1 wherein the device includes mounting means for mounting the housing to the conduit.

12. A fuel economiser device as claimed in claim 11 wherein the mounting means comprises end caps for the housing through which the conduit extends.

13. A fuel economiser device as claimed in claim 1 wherein the housing includes an outer covering.

14. A fuel economiser device as claimed in claim 13 wherein the covering is of an elastomeric material.

15. A fuel economiser device as claimed in claim 1 wherein at least some of the magnets are of Neodymium material.

16. A fuel economiser device as claimed in claim 1, wherein two of said magnets are positioned on opposite sides of said conduit, one of said two magnets being longer than the other of said two magnets and the other magnet is positioned centrally with respect to said one magnet.

17. A fuel economiser device comprising:

a conduit section through which fuel is passed;

a non magnetic housing around the conduit section; and a number of magnets positioned and orientated in the housing to generate a strong magnetic field through which fuel flowing in the conduit passes;

the housing being of a material to create a Faraday housing around the magnetic field generated by the magnets.

18. A fuel economiser device as claimed in claim 17, wherein the housing is of a ferrous metal material insulated from the magnets.

19. A fuel economiser device comprising:

a conduit section through which fuel is passed;

a non magnetic housing around the conduit section; and a number of magnets positioned and orientated in the housing to generate a strong magnetic field through which fuel flowing in the conduit passes;

the housing including a resin filling for embedding the magnets in the housing.

20. A fuel economiser device comprising:

a conduit section through which fuel is passed;

a non magnetic housing around the conduit section, said housing including an outer covering; and a number of magnets positioned and orientated in the housing to generate a strong magnetic field through which fuel flowing in the conduit passes.

21. A fuel economiser device as claimed in claim 20, wherein the covering is of an elastomeric material.

22. A fuel economiser device comprising:

a conduit section through which fuel is passed;

a non magnetic housing around the conduit section; and a number of magnets positioned and orientated in the housing to generate a strong magnetic field through which fuel flowing in the conduit passes, at least some of the magnets are of Neodymium material.

* * * * *